United States Patent
De Knijf (10) Patent No.: US 11,295,118 B2
(45) Date of Patent: Apr. 5, 2022

(54) ONLINE USER VERIFICATION WITHOUT PRIOR KNOWLEDGE OF THE USER

(71) Applicant: Avast Software s.r.o., Prague (CZ)

(72) Inventor: Jeroen De Knijf, Amsterdam (NL)

(73) Assignee: Avast Software, s.r.o., Prague (CZ)

( * ) Notice: Subject to any disclaimer, the term of this patent is extended or adjusted under 35 U.S.C. 154(b) by 18 days.

(21) Appl. No.: 16/022,400

(22) Filed: Jun. 28, 2018

(65) Prior Publication Data
US 2019/0005314 A1 Jan. 3, 2019

Related U.S. Application Data

(60) Provisional application No. 62/526,979, filed on Jun. 29, 2017.

(51) Int. Cl.
*G06K 9/00* (2006.01)
*G06F 21/32* (2013.01)
*G06F 16/583* (2019.01)
*H04L 29/06* (2006.01)

(52) U.S. Cl.
CPC ..... *G06K 9/00295* (2013.01); *G06F 16/5838* (2019.01); *G06F 21/32* (2013.01); *G06K 9/00288* (2013.01); *G06K 9/00979* (2013.01); *H04L 63/0861* (2013.01); *G06K 2009/00328* (2013.01)

(58) Field of Classification Search
None
See application file for complete search history.

(56) References Cited

U.S. PATENT DOCUMENTS

| | | | |
|---|---|---|---|
| 5,991,429 A | 11/1999 | Coffin et al. | |
| 9,098,584 B1 | 8/2015 | Fredinburg et al. | |
| 9,202,105 B1 | 12/2015 | Wang et al. | |
| 2008/0317294 A1* | 12/2008 | Hashimoto | G07C 9/37 382/115 |
| 2015/0113634 A1* | 4/2015 | Mau | H04L 63/0861 726/19 |
| 2016/0323274 A1 | 11/2016 | Chandrasekaran et al. | |
| 2017/0032485 A1* | 2/2017 | Vemury | G06Q 50/265 |
| 2017/0091533 A1 | 3/2017 | Mardikar | |

(Continued)

OTHER PUBLICATIONS

Wilson, Stephen. "Privacy Impact Assessment: DFAT Access to DIBP Face Verification Service (Retrieve Function) for Citizenship & Visa Images.", Aug. 2016, Lockstep Consulting, Version 1.4.1 (Year: 2016).*

(Continued)

*Primary Examiner* — Emily C Terrell
*Assistant Examiner* — Nathan J Bloom
(74) *Attorney, Agent, or Firm* — Avek IP, LLC; William B. Kircher (57) ABSTRACT

Systems and method verify a user based on facial image data, without prior information about the user. A user name and facial image of the user are received. A search query comprising the user name can be issued to one or more search engines. Images returned as a result of the search query can be filtered to determine a set of candidate images. The images in the set of candidate images can be compared to the facial image of the use to determine a probability of a match. If there is a match, the user can be considered verified.

19 Claims, 3 Drawing Sheets

(56) References Cited

U.S. PATENT DOCUMENTS

2017/0124385 A1* 5/2017 Ganong ............ G06K 9/00677

OTHER PUBLICATIONS

Viola et al., Robust Real-Time Face Detection, International Journal of Computer Vision, 2004, pp. 137-154, vol. 57, Issue 2, Kluwer Academic Publishers, The Netherlands.
Rowley et al., Neural Network-Based Face Detection, IEEE Transactions on Pattern Analysis and Machine Intelligence, Jan. 1998, pp. 23-38, vol. 20, Issue 1, Institute of Electrical and Electronics Engineers.
Taigman et al., DeepFace: Closing the Gap to Human-Level Performance in Face Verification, Proceedings of the IEEE Conference on Computer Vision and Pattern Recognition, 2014, 8 pages.
Sun et al., Deep Learning Face Representation by Joint Identification-Verification, Advances in neural information processing systems, 2014, pp. 1-9.
Kumar et al., Attribute and Simile Classifiers for Face Verification, IEEE 12th International Conference on Computer Vision, 2009, 8 pages, Institute of Electrical and Electronics Engineers.
Järvelin et al., IR evaluation methods for retrieving highly relevant documents, Proceedings of the 23rd Annual International ACM SIGIR Conference on Research and Development in Information Retrieval, 2000, pp. 41-48, Association for Computing Machinery, New York, New York.
Wu et al., Eulerian Video Magnification for Revealing Subtle Changes in the World, 2012, 8 pages.
Facial Recognition System, Wikipedia, Jun. 25, 2017, 12 pages, https://en.wikipedia.org/w/index.php?title+facial_recognition_system&oldid=787427622. Accessed Jul. 2, 2019.

* cited by examiner

ONLINE USER VERIFICATION WITHOUT PRIOR KNOWLEDGE OF THE USER

CROSS-REFERENCE TO RELATED APPLICATIONS

This Application claims priority to U.S. Provisional Patent Application Ser. No. 62/526,979, filed on Jun. 29, 2017, entitled "Online User Verification without Prior Knowledge of the User," the entire disclosure of which is incorporated herein by reference.

FIELD

The disclosure relates generally to online computer systems, and more particularly, to verifying a user without having any prior knowledge about the user.

BACKGROUND

The use of online computer systems to provide information, goods and services to users continues to grow. It is often desirable to verify that a user of an online system is who the person claims to be. For example, in the context of an online shop that sells goods or services, it is often desirable to verify that the person purchasing the goods is who he or she claims to be. Conventional systems typically require some knowledge about the user that is provided before a transaction is allowed to take place. For example, the user may be required to sign up (e.g., register, create an account, etc.) for a service, and the service provider must then store information about the user in order to verify the user prior to providing information, goods, or services.

SUMMARY OF THE INVENTION

The object of the invention is to verify a user based on facial image data, without prior information about the user. A user name and facial image of the user are received. A search query comprising the user name can be issued to one or more search engines. Images returned as a result of the search query can be filtered to determine a set of candidate images. The images in the set of candidate images can be compared to the facial image of the use to determine a probability of a match. If there is a match, the user can be considered verified.

BRIEF DESCRIPTION OF THE DRAWINGS

For a better understanding of the inventive subject matter, reference may be made to the accompanying drawings in which.

DETAILED DESCRIPTION

In the following detailed description of example embodiments, reference is made to the accompanying drawings that form a part hereof, and in which is shown by way of illustration specific example embodiments in which the inventive subject matter may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Figure 1:
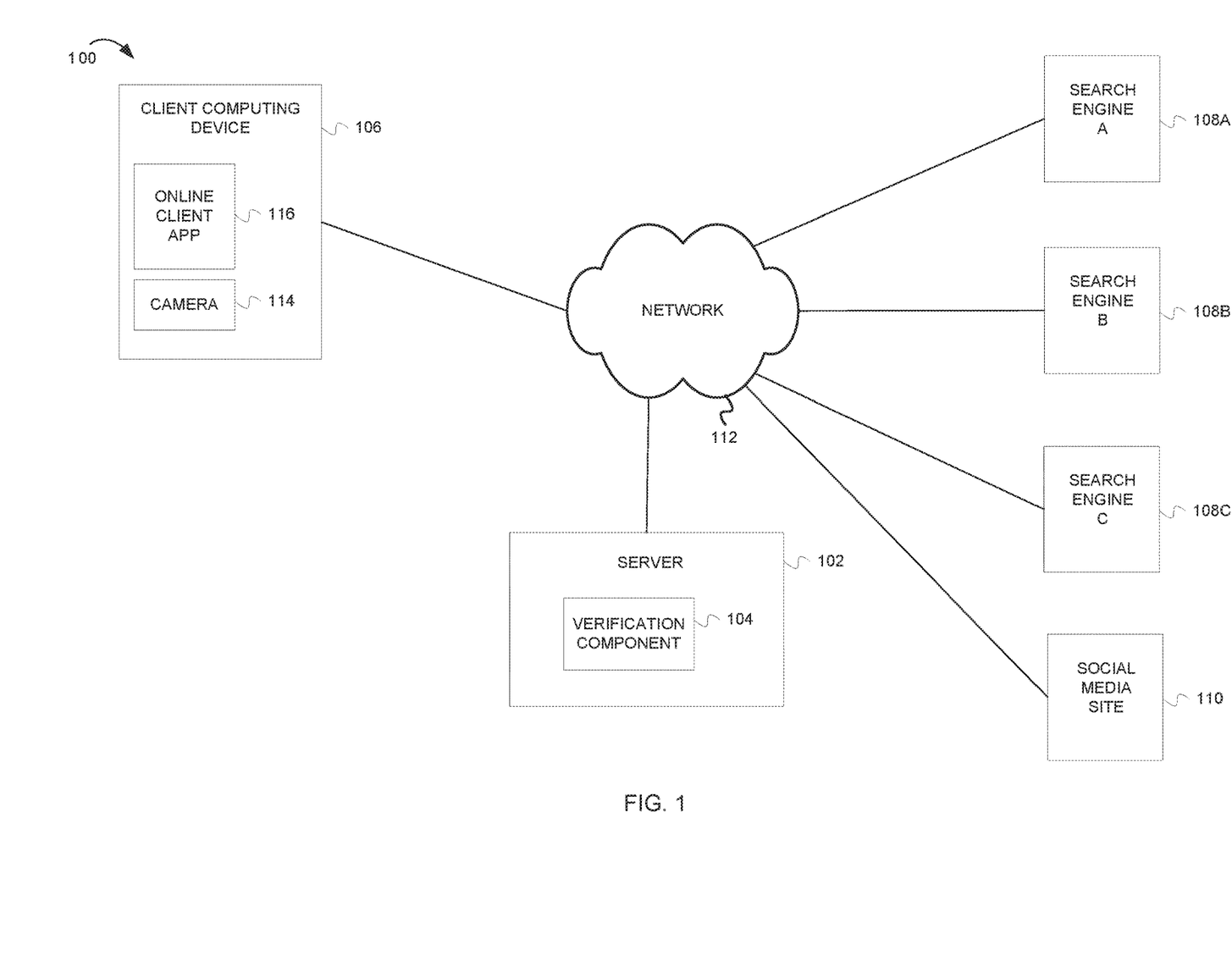
FIG. 1 is a block diagram of a system environment including a server that verifies a user without prior knowledge about the user according to embodiments.

FIG. 1 is a block diagram of a system environment 100 including a server that verifies a user without prior knowledge about the user according to embodiments. In some aspects, system environment 100 includes a server 102, a client computing device 106, one or more search engines 108A-108C (referred to generically as search engine 108) and optionally a social media site 110, all coupled to a network 112. Network 112 can be any combination of one or more wired and/or wireless networks. In some embodiments, network 112 can include the Internet.

Server 102 provides one or more services to clients on the network 112. Server 102 can include a shopping site or auction site that can sell goods or services, a site that provides information services, or any other site that provides a service to clients on the network 112. Some or all of the services on server 102 can verify a user prior to completing a purchase of goods or services, or prior to allowing a user to access information or other services provided by the server 102. Verification component 104 can verify a user as described herein. Verification component 104 can be incorporated into service programs providing services to clients, or it can be a standalone program that communicates with the service programs.

Client computing device 106 can be any type of device having at least one processor and memory and can be coupled to a camera 114. For example, client computing device 106 can be a smart phone, a laptop computer, a tablet computer, a desktop computer, a server computer, a set top box, a game console, an Internet of Things (IoT) device etc. Client computing device 106 can include an online client application 116. Online client application 116 can be any type of application that utilizes services provided by server 102. For example, online client application 116 can be a web browser or an application on a smart phone that accesses servers via network 112. The embodiments are not limited to any particular type of online client application. Camera 114 can capture image data as a single image and/or as a video stream. Although shown in FIG. 1 as integrated with client computing device 106, camera 114 can be external to client computing device 106 and communicate either wirelessly or via a wired connection to client computing device 106.

Search engines 108A-C can be any type of search engine available on the Internet or other network. Examples of such search engines include Google, Bing, Yahoo Search, Yandex, Baidu, etc. The embodiments are not limited to any particular search engine. Although three search engines 108A-C are shown in FIG. 1, those of skill in the art having the benefit of the disclosure will appreciate that more or fewer search engines could be utilized in various embodiments.

Social media site 110 provides social media services. A social media site may allow users to create and join groups of users, and to share and consume information between users. Examples of social media sites include Facebook, LinkedIn, Google Plus, Twitter etc. The embodiments are not limited to any particular social media site.

During a verification operation, a user provides a name and a picture taken by camera 114 to a verification component 114. The name can be used to retrieve publicly available online images of the user. The verification component can determine a similarity between the retrieved images and the picture provided by the user. This similarity of the picture with one or more of the retrieved images can be used to determine how likely the user is who he or she claims to be. Further details on the operation of system environment 100 are provided below with reference to FIG. 2.

Figure 2:
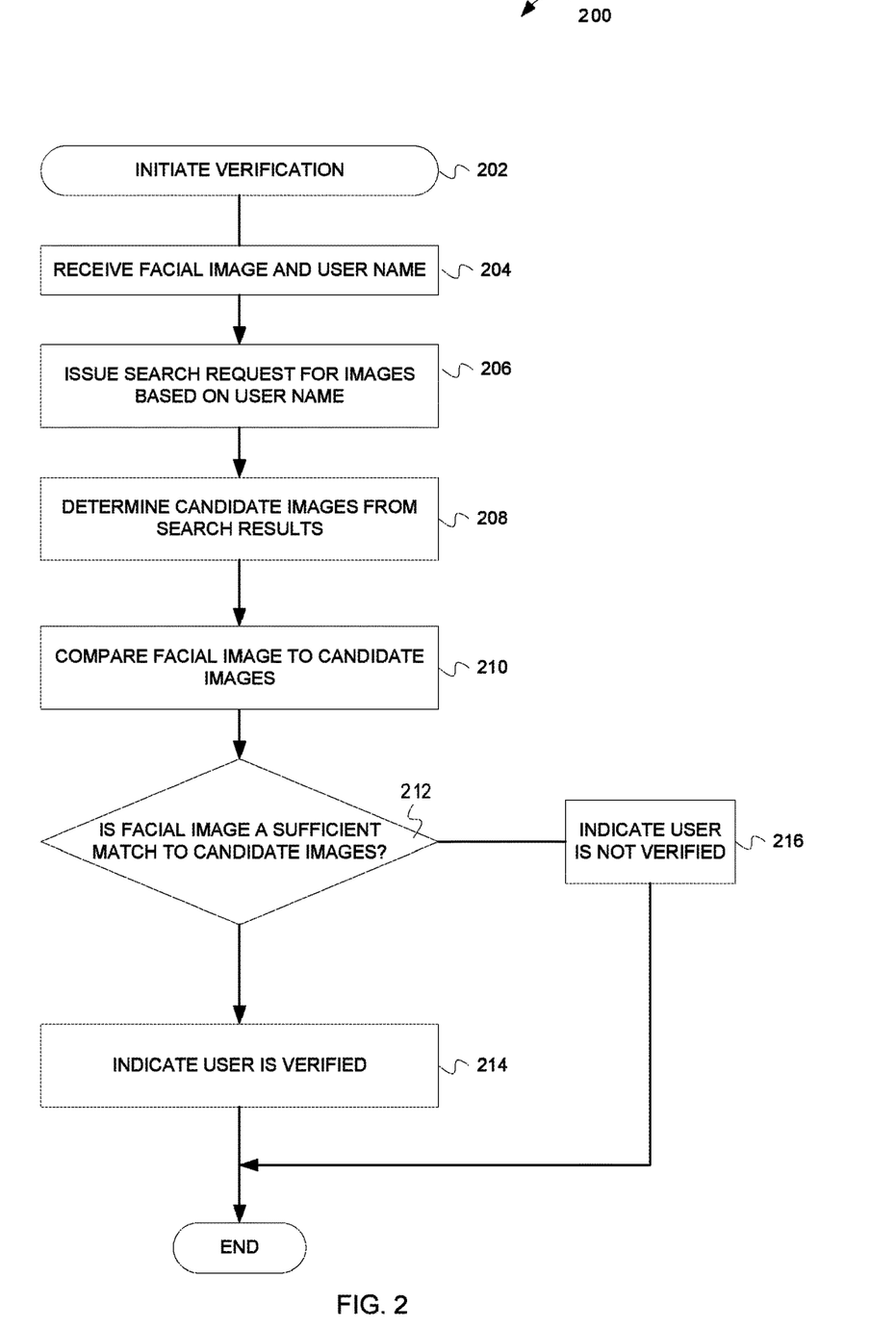
FIG. 2 is a flow chart describing a method for verifying a user without prior knowledge about the user.

FIG. 2 is a flow chart describing a method for verifying a user without prior knowledge about the user. The method may, in some aspects, constitute computer programs made up of computer-executable instructions. Describing the method by reference to a flowchart enables one skilled in the art to develop such programs including such instructions to carry out the method on suitable processors (the processor or processors of the computer executing the instructions from computer-readable media). The method illustrated in FIG. 2 is inclusive of acts that may be taken by a system environment 100, including a verification component 104 of a server 102 executing an example embodiment of the invention. In some aspects, the server 102 does not have, and does not use, any prior knowledge or information about the user. For example, the user need not be registered with the server 102, have an account on the server 102, or otherwise have information stored about the user on server 102.

At block 202, a verification of a user is initiated. The verification may be initiated in response to a purchase to be made by the user from a shopping site on a server 102, or a request for information or other services from a web site or other online service.

At block 204, a user name for the user is received by a verification component. Additionally, facial image data from a picture of the user taken by camera 114 of the user's computing device 102 is received by the verification component. In some embodiments, the server can prompt the user to cause the picture to be taken. Some embodiments can verify that the facial image data includes a frontal image of the face, and that the image size and quality meet predetermined or configurable thresholds. One example algorithm for determining if an image contains a frontal image of a face can be found in Viola, P. and Jones, M. J., 2004. Robust Real-time Face Detection. *International Journal of Computer Vision,* 57(2), which is hereby incorporated by reference herein for all purposes.

At block 206, the verification component issues a search request including the user name provided at block 204 to one or more search engines. In some embodiments, the search request provides search parameter data to limit the search results to images. Further, in some embodiments, the search request provides search parameter data to limit the search results to exact matches to the user name provided at block 204. In some embodiments, a search request can be issued to one or more social media sites instead of, or in addition to, issuing the search request to a search engine. In some embodiments, the search request can be provided to a single search engine. In alternative embodiments, the search request can be provided to multiple search engines, and the search results from the multiple search engines can be merged and deduplicated.

At block 208, the search results can be filtered to determine a set of candidate images. In some embodiments, the search results can be filtered to remove images from the search results that do not contain a frontal face. In further embodiments, the search results can be filtered to remove images that do not contain exactly one frontal face. Facial recognition techniques can be used to determine if the image is to be filtered. Examples of such techniques are described in Viola, P. and Jones, M. J., 2004. Robust Real-time Face Detection (cited above) and in Rowley, H. A., Baluja, S. and Kanade, T., 1998. Neural network-based face detection. *IEEE Transactions on Pattern Analysis and Machine Intelligence,* which is hereby incorporated by reference herein for all purposes.

The search results can be filtered to produce a predetermined or configurable number of candidate images. For example, in some embodiments, the search results are filtered to produce five candidate images that have exactly one frontal face. If there are less than five images, then all of the images with a detected face can be included in the candidate images. The filtering can also be based on ranking of the images. For example, the search engines typically rank the search results and present the search results in order of ranking. The order of the images provided by the search engines can be preserved and used as part of the filtering process.

At block 210, the facial image data received at block 204 is compared to the facial images in the set of candidate images produced by filtering the search results to determine matches. The comparison can use a technique referred to as face verification, which determines the probability that a face in one image belongs to the same person as a face in a second image. Algorithms for these techniques are among others described in Taigman, Y., Yang, M., Ranzato, M. A. and Wolf, L., 2014. Deepface: Closing the Gap to Human-level Performance in Face Verification. *Proceedings of the IEEE Conference on Computer Vision and Pattern Recognition;* Sun, Y., Chen, Y., Wang, X. and Tang, X., 2014. Deep Learning Face Representation by Joint Identification-verification. *Advances in Neural Information Processing Systems*; Kumar, N., Berg, A. C., Belhumeur, P. N. and Nayar, S. K., 2009, September. Attribute and Simile Classifiers for Face Verification. *Computer Vision, 2009 IEEE 12th International Conference*; each of which are incorporated by reference herein for all purposes. A matching score can be determined between the facial image data in the picture taken by the user (received at block 204) and each of the candidate images determined as most relevant at block 208. The matching scores can be inserted into an ordered list of matching scores X, with X possibly being empty (i.e. in the case where no images containing frontal face pictures were provide as results by the search engine(s)). For example, in embodiments where the candidate set includes at most five images, the list X will include at most five scores, one for each candidate image. For the non-empty case, $X=\{x_i, \ldots, x_j\}$ with $1 \le i \le j \le 5$. In these embodiments, a score of a candidate image reflects the probability that the face in the $i^{th}$ retrieved image in the candidate set and the face in the picture provided by the user are the same face. In some embodiments, a score of 0 (zero) means no similarity at all, while a score of 1 (one) means that the same face is in both images. Scores between 0 and 1 represent a degree of similarity between the images or a probability that the same face is in both images.

In some embodiments, the matching scores for each of the set of candidate images can be combined into a single final match score. The final match score can be determined using a ranking evaluation metric. For example, in some embodiments, a Normalized Discounted Cumulative Gain can be determined as described in Järvelin, K. and Kekäläinen, J., 2000, July. IR Evaluation Methods for Retrieving Highly Relevant Documents. *Proceedings of the 23rd Annual International ACM SIGIR Conference on Research and Development in Information Retrieval* (pp. 41-48). ACM), which is hereby incorporated by reference herein for all purposes. A characteristic of this measure is that it takes the order and score of the matching scores into account and is independent of the number of results returned. In some embodiments, the final match score can be determined according to the following formula:

$$score = \frac{\sum_{i=1}^{|X|} \frac{2^{x_i}}{\log_2(i+1)}}{IDGC_P}$$

Where $IDGC_P$ is the theoretical maximal discounted cumulative gain score obtained from the optimal ranking, that is, the score obtained when all match scores would be optimal (i.e. equal to 1). This final score is again a probability between 0 and 1, with 1 representing total confidence that the face in the picture of the user obtained at block 204 matches the faces in the set of candidate images.

At decision block 212, the verification component determines if the face in the picture of the user obtained at block 204 matches the faces in the set of candidate images. For example, the verification component can determine if the final match score is above a threshold value. A match score over 0.5 indicates confidence regarding the identity of the user. The choice of a threshold value is generally based on a tradeoff between the impact of identity fraud if a false match is determined versus the cost of missed opportunities if an overly restrictive threshold is chosen.

As described above, some embodiments determine the final score based on a score of each image. However, in alternative embodiments, a match may be determined if a single image in the set of candidate images has a sufficiently high match score.

If the final match score is exceeds the threshold value, then the method proceeds to block 214 to indicate that the user is verified. That is, the user is who he or she claims to be. If the final match score does not exceed the threshold value, then the method proceeds to block 216 to indicate that the user could not be verified.

Variations in Alternative Embodiments

Aspects of certain embodiments have been provided above. Further aspects of alternative embodiments will now be presented.

It may be the case that a user has a common name (e.g., John Smith) or shares a name with a celebrity or other well-known person (e.g., Michael Jordan). In such cases, additional parameters can be added to the search query to narrow the results returned. For example, the search query can include available demographic data. The search query can therefore include location data for the user. Further, the search query could include gender, age, or other data if available or provided by the user.

Additionally, a user may try to impersonate another person by taking a picture of a picture of the other person instead of taking their own picture. In some embodiments, the verification component can utilize techniques to detect that the picture was taken by the user, and was not reconstructed from a photograph. Such techniques are described in U.S. Pat. No. 9,202,105 entitled "Image Analysis for User Authentication" and in Wu, H. Y., Rubinstein, M., Shih, E., Guttag, J., Durand, F. and Freeman, W., 2012. *Eulerian Video Magnification For Revealing Subtle Changes in the World*. If the system detects that the supplied image data is not that of the actual user (i.e., the user has taken a picture of a picture of another person), then the verification operation can indicate that the user is not verified.

As can be seen from the above, the systems and methods described herein can provide for a more efficient way to verify a user is who he or she claims to be. The systems and methods of some embodiments described herein allow a user to be verified by a server computer such as a web shop without requiring the server computer to maintain storage and other infrastructure to store registration data and image data. The system and methods of some embodiments described herein can also be more efficient for the user, as the user need only supply a name and picture in order to be verified, the user does not have to create an account or register with a server computer. Further, embodiments can provide improvements to verification technology by providing a means to verify a user even when the user has not previously provided verification related data to a party. The user can be verified without going through a laborious or inconvenient registration process.

Figure 3:
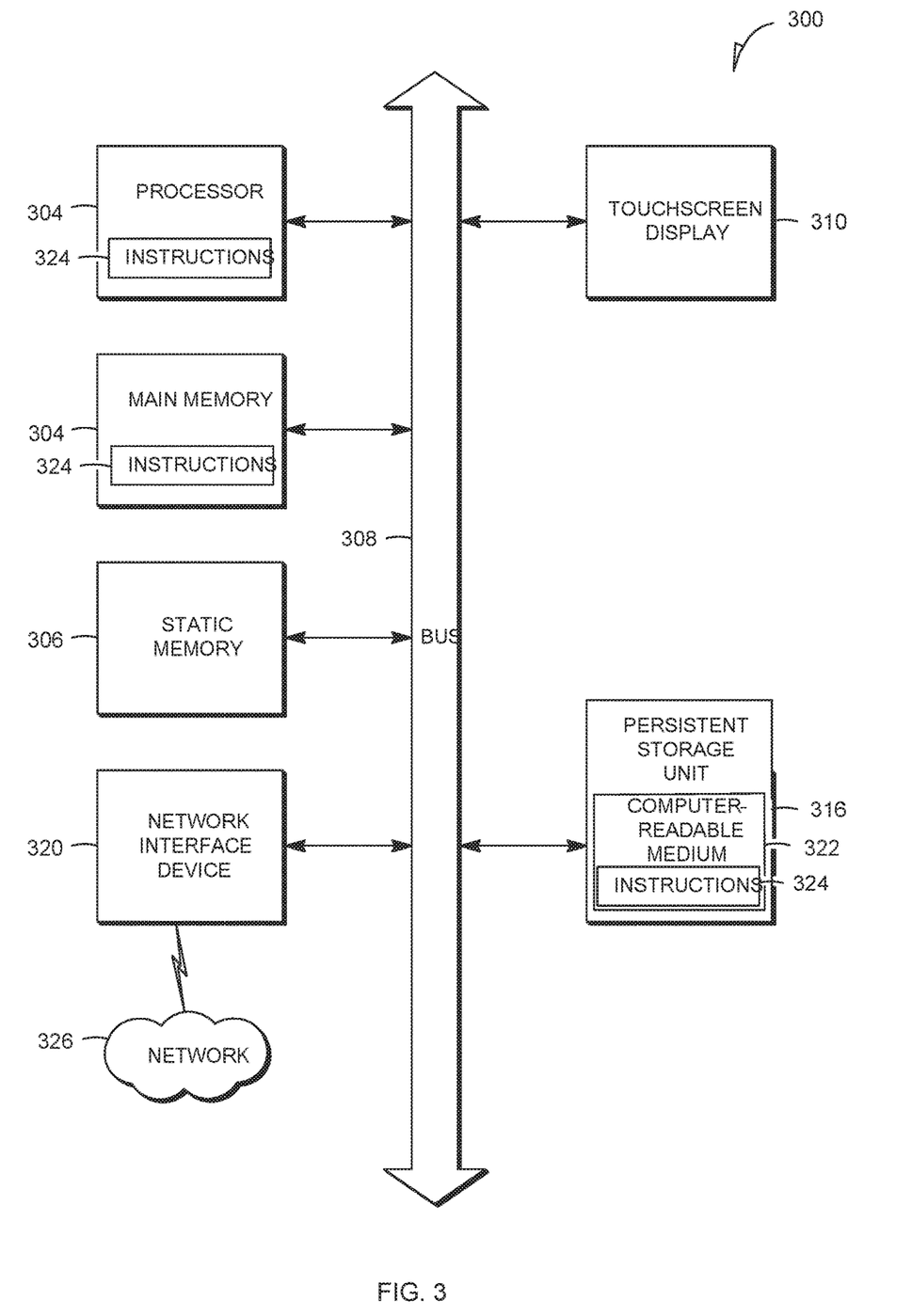
FIG. 3 is a block diagram of an example embodiment of a computer system upon which embodiments of the inventive subject matter can execute.

FIG. 3 is a block diagram of an example embodiment of a computer system 300 upon which embodiments of the inventive subject matter can execute. The description of FIG. 3 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 3, an example embodiment extends to a machine in the example form of a computer system 300 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 300 may include a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). In example embodiments, the computer system 300 also includes one or more of an alpha-numeric input device 312 (e.g., a keyboard), a user interface (UI) navigation device or cursor control device 314 (e.g., a mouse), a disk drive unit 316, a signal generation device 318 (e.g., a speaker), and a network interface device 320.

The disk drive unit 316 includes a machine-readable medium 322 on which is stored one or more sets of instructions 324 and data structures (e.g., software instructions) embodying or used by any one or more of the methodologies or functions described herein. The instructions 324 may also reside, completely or at least partially, within the main memory 304 or within the processor 302 during execution thereof by the computer system 300, the main memory 304 and the processor 302 also constituting machine-readable media.

While the machine-readable medium 322 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 324 may further be transmitted or received over a communications network 326 using a signal transmission medium via the network interface device 320 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for verifying a user, the method comprising:
providing access to a user of a computing device, wherein providing access comprises allowing use, by the user, of the computing device and/or applications associated with the computing device without requiring the user to login, register, or provide identifying information to the computing device and/or applications and without the computing device and/or applications having stored information about the user;

initiating a verification operation comprising receiving, by one or more processors, a name of the user and a picture comprising facial image data of the user;

issuing a search request of publicly available online images including the name of the user as a search parameter;

receiving a set of one or more images in response to the search request;

determining a match score for the set of one or more images with respect to the facial image data of the user; and in response to determining that the match score exceeds a threshold value, indicating that the user is verified.

2. The method of claim 1, wherein determining a match score for the one or more images includes determining an individual match score for each image in the one or more images and determining the match score based, at least in part, on the individual match score for each image.

3. The method of claim 1, further comprising filtering search results received in response to the search request to determine the set of one or more images.

4. The method of claim 3, wherein filtering the search results includes removing images that do not include facial image data.

5. The method of claim 3, wherein filtering the search results includes removing images that are not a frontal image of a single face.

6. The method of claim 1, further comprising:
in response to a verification operation, receiving the facial image data of the user via a camera communicably coupled to the one or more processors.

7. The method of claim 1, further comprising:
in response to determining that the name of the user comprises a common name, including demographic data in the search request.

8. A machine-readable storage medium having stored thereon computer-executable instructions that, when executed by one or more processors of a device, cause the device to:

provide access to a user of a computing device, wherein providing access comprises allowing use, by the user, of the computing device and/or applications associated with the computing device without requiring the user to login, register, or provide identifying information to the computing device and/or applications and without the computing device and/or applications having stored information about the user;

initiate a verification operation comprising receiving a name of the user and a picture comprising facial image data of the user;

issue a search request of publicly available online images including the name of the user as a search parameter;

receive a set of one or more images in response to the search request;

determine a match score for the set of one or more images with respect to the facial image data of the user; and in response to a determination that the match score exceeds a threshold value, indicate that the user is verified.

9. The machine-readable storage medium of claim 8, wherein the computer-executable instructions to determine a match score for the one or more images include computer-executable instructions to determine an individual match score for each image in the one or more images and determine the match score based, at least in part, on the individual match score for each image.

10. The machine-readable storage medium of claim 8, wherein the computer-executable instructions further comprise computer-executable instructions to filter search results received in response to the search request to determine the set of one or more images.

11. The machine-readable storage medium of claim 10, wherein the computer-executable instructions to filter the search results includes computer-executable instructions to remove images that do not include facial image data.

12. The machine-readable storage medium of claim 10, wherein the computer-executable instructions to filter the search results includes computer-executable instructions to remove images that are not a frontal image of a single face.

13. The machine-readable storage medium of claim 8, wherein the computer-executable instructions further comprise computer-executable instructions to:
in response to a verification operation, receive the facial image data of the user via a camera communicably coupled to the one or more processors.

14. The machine-readable storage medium of claim 8, wherein the computer-executable instructions further comprise computer-executable instructions to:
in response to determination that the name of the user comprises a common name, include demographic data in the search request.

15. An apparatus comprising: one or more processors and machine-readable storage medium having stored thereon computer-executable instructions that, when executed by the one or more processors, cause the apparatus to:

provide access to a user of a computing device, wherein providing access comprises allowing use, by the user, of the computing device and/or applications associated with the computing device without requiring the user to login, register, or provide identifying information to the computing device and/or applications and without the computing device and/or applications having stored information about the user;

initiate a verification operation comprising receiving a name of the user and a picture comprising facial image data of the user;

issue a search request of publicly available online images including the name of the user as a search parameter;

receive a set of one or more images in response to the search request;

determine a match score for the set of one or more images with respect to the facial image data of the user; and in response to a determination that the match score exceeds a threshold value, indicate that the user is verified.

16. The apparatus of claim 15, wherein the computer-executable instructions to determine a match score for the one or more images include computer-executable instructions to determine an individual match score for each image in the one or more images and determine the match score based, at least in part, on the individual match score for each image.

17. The apparatus of claim 15, wherein the computer-executable instructions further comprise computer-executable instructions to remove images from the set of one or more images that do not include facial image data.

18. The apparatus of claim 15, wherein the computer-executable instructions further comprise computer-executable instructions to remove images from the set of one or more images that are not a frontal image of a single face.

19. The apparatus of claim 15, wherein the computer-executable instructions further comprise computer-executable instructions to:

in response to a verification operation, receive the facial image data of the user via a camera communicably coupled to the one or more processors.

* * * * *